United States Patent [19]

Smith, Jr. et al.

[11] Patent Number: 4,825,073

[45] Date of Patent: Apr. 25, 1989

[54] METHOD FOR DETERMINING DEPTH OF PENETRATION OF RADIOACTIVE TRACERS IN FORMATION FRACTURES

[75] Inventors: Harry D. Smith, Jr.; Larry L. Gadeken, both of Houston, Tex.

[73] Assignee: Halliburton Logging Services Inc., Houston, Tex.

[21] Appl. No.: 132,437

[22] Filed: Dec. 14, 1987

[51] Int. Cl.$^4$ .............................. G01V 5/04; G01V 5/06
[52] U.S. Cl. ...................................... 250/260; 250/270
[58] Field of Search ................ 250/260, 259, 269, 270

[56] References Cited

U.S. PATENT DOCUMENTS

| | | | |
|---|---|---|---|
| 2,810,076 | 10/1957 | Mardock | 250/260 |
| 3,739,171 | 6/1973 | Scott | 250/270 |
| 4,032,780 | 6/1977 | Paap et al. | 250/266 |
| 4,450,354 | 5/1984 | Smith, Jr. et al. | 250/256 |
| 4,504,736 | 3/1986 | Smith, Jr. et al. | 250/256 |
| 4,578,580 | 3/1986 | Smith, Jr. | 250/269 |
| 4,585,939 | 4/1986 | Arnold et al. | 250/256 |

FOREIGN PATENT DOCUMENTS 125909  5/1959  U.S.S.R. .............................. 250/260

OTHER PUBLICATIONS

L. L. Gadeken and H. D. Smith, Jr., "TracerScan*-A Spectroscopy Technique for Determining the Distribution of Multiple Radioactive Tracers in Downhole Operations." Paper ZZ, 27th, Annual SPWLA Symposium, Houston, Texas (Jun. 1986) pp. 1-15.

H. D. Smith, Jr., C. A. Robbins, D. M. Arnold, L. L. Gadeken and J. G. Deaton, "A Multi-Function Compensated Spectral Natural Gamma Ray Logging System." SPE Paper 12050, 58th Annual Technical Conference and Exhibition, San Francisco, California (Oct. 1983), pp. 1-15.

Primary Examiner—Janice A. Howell
Assistant Examiner—Constantine Hannaher
Attorney, Agent, or Firm—William J. Beard

[57] ABSTRACT

A method for determining the mean depth of penetration of one or more radioactive tracers injected by a hydraulic fracturing process into a fractured formation disposed about a well bore as an indication of the extent of radial fractures including the steps of measuring with a radioactivity detector in the well bore at the depth of the formation fracture, the degradation of the gamma ray energy spectra of the radioactive tracer in the fractured formations resulting from the traverse of radiation through the formations and borehole to the detector; obtaining a ratio $C_A/C_B$ of the count rates C hd A and $C_B$ in two energy ranges where the range for obtaining $C_A$ is sensitive to primary radiation reaching the detector without Compton scattering and the other region for obtaining $C_B$ detects radiation degraded through Compton scattering collisions. The ratio $C_A/C_B$ is a tracer penetration index (TPI) corresponding to the mean radial distance R between tracer and detector and the extent of radial fracture. For removing potential interference in the determination of R due to the presence of the tracer in the borehole, the method also provides for obtaining a ratio of count rates M/P in two low energy regions of the tracer spectrum—one region "M" sensitive only to Compton scattered radiation and a region "P" sensitive to photoelectric absorption in iron. The ratio M/P is a tracer borehole index (TBI) which indicates the relative presence of tracer in the formation compared to the borehole, and whether the borehole count rate obtained from a selected interval of well bore containing only borehole tracer needs to be removed from the total spectra observed in an interval of interest to obtain a borehole insensitive calculation of tracer penetration index.

13 Claims, 3 Drawing Sheets

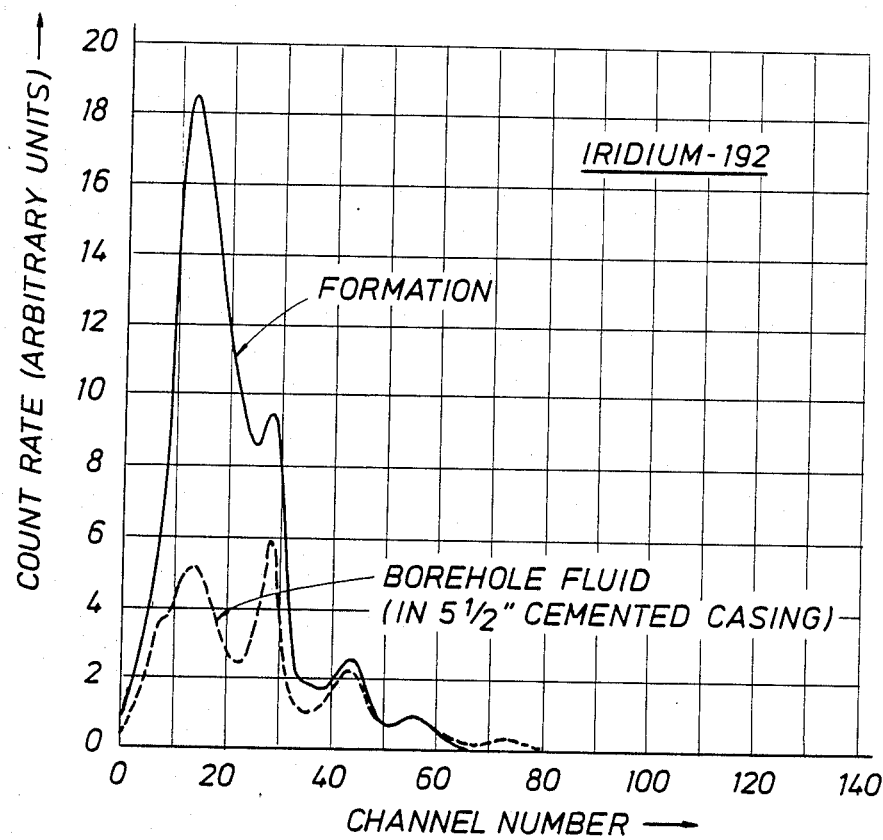
FIG.2 FORMATION AND BOREHOLE SPECTRA FOR $^{192}$Ir
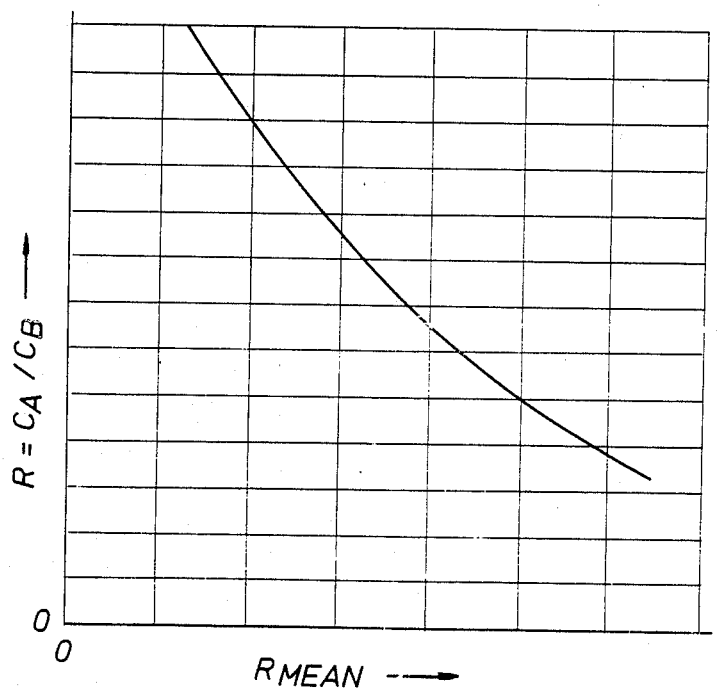
FIG.4

EFFECTS OF PHOTOELECTRIC ABSORPTION FOR 198Au IN (A) BOREHOLE AND FORMATION COMPARED WITH (B) CEMENT ANNULUS AND FORMATION. THE PHOTOELECTRIC, MID-RANGE AND COMPTON WINDOWS ARE INDICATED BY P, M AND C, RESPECTIVELY

METHOD FOR DETERMINING DEPTH OF PENETRATION OF RADIOACTIVE TRACERS IN FORMATION FRACTURES

FIELD OF THE INVENTION

This invention relates generally to radioactivity well logging of a well bore using gamma ray spectroscopy techniques, and more particularly, to a method for determining the character of formation fractures from radioactive tracer penetration into earth formation fractures about a well bore.

BACKGROUND OF THE INVENTION

The fracturing of earth formations in the vicinity of a well bore traversing earth formations is a commonly employed technique in the petroleum industry for stimulating the flow of oil or gas from the fractured formations. In the typical fracturing operation, large volumes of fluid, often water, are pumped downhole at high pressure to stress the formations of interest, usually through perforated casings. A solid particulate material, such as sand, is usually included as a proppant with the fluid to prop open the induced fractures in formations so that the formation fractures do not close when the pumping or stress pressure is released.

A radioactive tracer material can be used to label or identify either the fluid or the proppant which has been injected into the fractured formations. Thereafter, a gamma ray well log can be run to measure and record the resulting gamma ray activity as a function of depth for locating the radioactivity of the tracer and hence the location of the fracturing fluid or proppant. In complex fracturing operations where multiple zones are fractured or where "frac" fluids are injected in several stages, it may be desirable to inject and monitor multiple tracers in the fracturing operations. Multiple tracer uses might include, for example, injecting a different radioactive isotope into each zone, or at each stage of the operation, or placing radioactive isotopes onto the various solid and fluid components of the fracturing material. Monitoring of each of these radioactive tracer isotopes is desirable and can be used for an accurate analysis of the effectiveness of the fracturing operation, particularly as to determining the location, extent and radial location of the fractures.

Knowledge of the extent of a fracture in a formation as evidenced by information of the fracture configuration and the extent of the fracture in the direction radially away from the well bore is important in determining the success of a fracture operation. Such information can be used for optimizing future fracturing operations in other wells in the vicinity. Such information can also be of assistance in the diagnosis of post-stimulation problems.

In this respect, identification of a vertical placement of a tracer to indicate fracture travel in a vertical direction may be accomplished in some instances by gamma ray logging tools which are sensitive only to the overall presence of gamma rays. In some cases, however, the gamma ray log is inadequate because of its inability to distinguish between multiple tracer materials in place in the fracture and tracer materials inside the well bore or in channels or voids in the cement. Gamma ray spectroscopy can be used to discriminate in these cases, and to improve the estimates of vertical fracture travel. It has been used, as disclosed in U.S. Pat. No. 4,032,780, to detect gamma radiation from water flow behind a casing in a method for determining the distance from a detector in a well bore to the mean center of a water flow path behind casing. However, an indication of the extent of the fracture travel in a radial direction by a determination of a mean tracer penetration, i.e. the mean horizontal distance from the tracer in the formation to the detector in the logging tool has not heretofore been obtainable.

Gamma ray logs are often used in well logging for such purposes as detecting naturally occurring radioactive isotopes in downhole minerals, and hence the delineation of nonradioactive relative to highly radioactive minerals, or in connection with radioactive tracer operations. It is characteristic of gamma rays, that in passing through matter, the gamma rays experience successive Compton scattering interactions with the atoms of the material and lose energy with each interaction. After losing enough energy, they may be completely removed by interacting with atoms of the material through the phenomenon of photoelectric absorption. Natural gamma ray spectroscopy tools now in use in well logging operations can also measure the energy spectra of gamma rays emitted by radioactive tracers as they are detected by a gamma ray detector in the well. A radiation energy measuring tool of this type is described in a paper by Smith, H. D. Jr., Robbins, C. A., Arnold, D. M. Gadeken, L. L. and Deaton, J. G., "A Multi-Function Compensated Spectral Natural Gamma Ray Logging System," SPE Paper #12050, Fifty-Eighth Annual Technical Conference, San Francisco, Calif., Oct. 5–8, 1983. Each radioactive tracer material displays its own individual gamma ray spectrum or signature as affected by Compton scattering and photoelectric absorption phenomena. It is possible to accurately monitor multiple radioactive tracers by deconvolving the gamma ray spectral data into contributions from each individual radioactive tracer isotope as a function of depth. Such a technique is described in a paper by Gadeken, L. L. and Smith, H. D. Jr., entitled "TracerScan-A Spectroscopy Technique for Determining the Distribution of Multiple Radioactive Tracers in Downhole Operations," Paper ZZ, SPWLA Twenty-Seventh Annual Logging Symposium, Houston, Tex., June 9–13, 1986.

SUMMARY OF THE INVENTION

The subject invention is directed to methods for determining the mean depth of penetration of radioactive tracer material in a fractured earth formation as an indication of the extent of a horizontal or radial fracture. The methods of the invention are based primarily on the physical principle that if a gamma ray emitting source in earth formations is located farther from the logging tool detector, then its gamma rays traverse more material in reaching the detector and the "softer" its spectrum will be, i.e. the more its individual spectral shape will be shifted to lower energies. By quantitatively measuring the amount of spectral degradation and monitoring the shape of the tracer spectrum by a ratio of counts in a high energy part of the spectrum to the counts in a lower energy, strongly Compton scattered part of the spectrum, as will hereinafter be described, the tracer data can be processed. Such processing can include normalizing the data, removing the natural background radiation data, applying a weighted-least-squares algorithm to determine elemental concentration and location, and deriving an indication of the amount of intervening material and the mean tracer depth into the formation relative to the borehole.

Since there is a potential interference in determination of mean tracer depth into a formation as might be caused by the presence and migration of tracer in the borehole, the invention in one embodiment also relies on the phenomenon of the photoelectric effect and the measurement of photoelectric absorption ratios in a method for compensating for the effects of tracer in the borehole.

The invention may best be understood by the following detailed description taken in conjunction with the accompanying drawings.

BRIEF DESCRIPTION OF THE DRAWINGS

In the accompanying drawings which form part of the specification and are to be read in conjunction therewith:

FIG. 2 is a graphical representation of formation and borehole spectra for $^{192}$Ir, illustrating large differences in spectral shape due to spectral degradation of gamma rays in traversing different amounts of materials between the source and detector;

FIG. 4 is a graphical plot showing a representative functional relationship between the count rate ratio or tracer penetration index of the invention and the mean radial distance between the detector and a tracer in a formation.

DETAILED DESCRIPTION OF THE PREFERRED EMBODIMENTS

Figure 1:
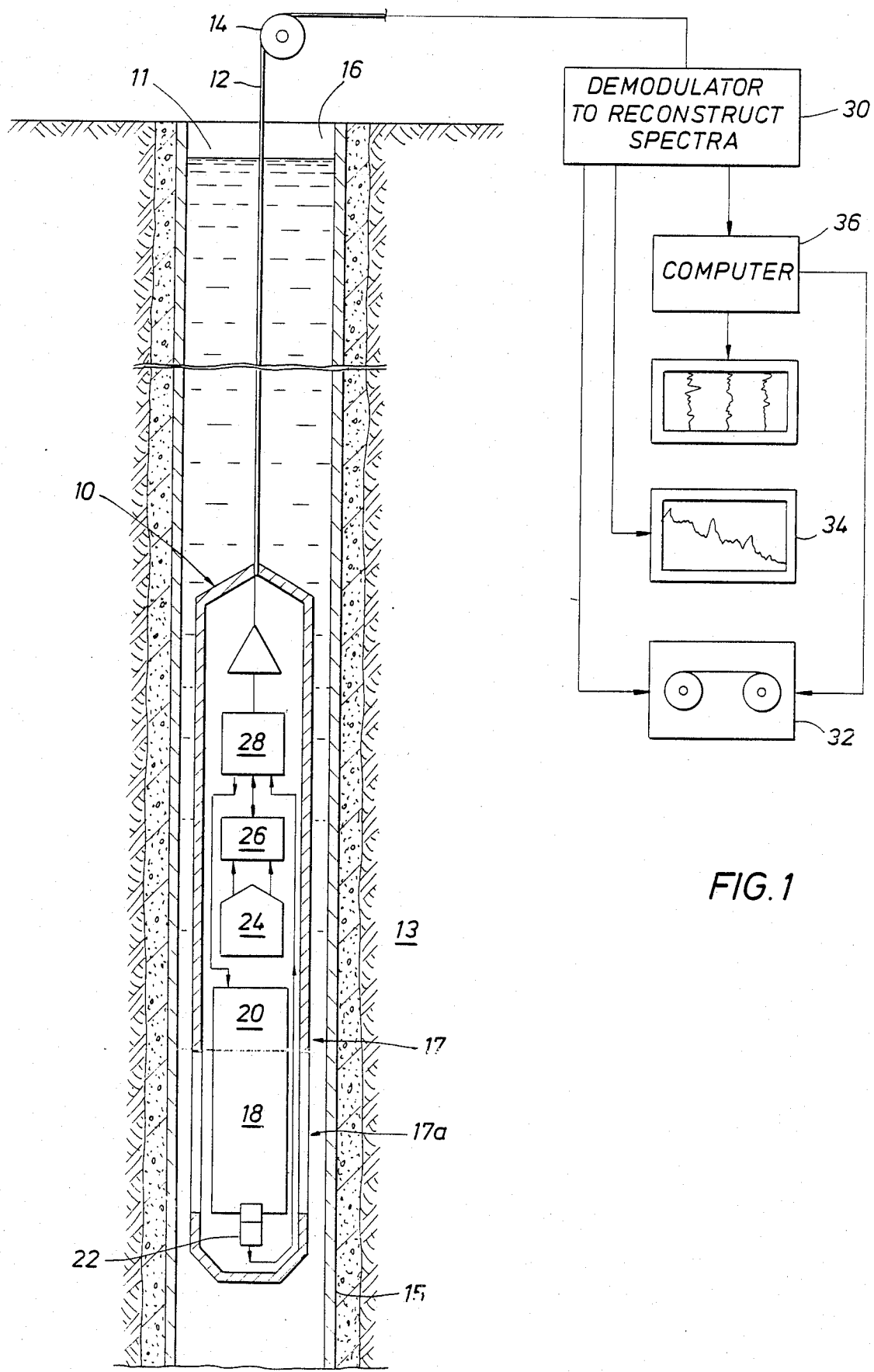
FIG. 1 is a schematic drawing of the downhole and surface equipment comprised in a well logging system employed in practicing the invention.

A gamma ray logging system which maybe used for practicing the methods of the invention is illustrated schematically in FIG. 1. This system, which can be used for the detection of natural formation radioactivity sources, is also well suited to detecting and locating radioactive sources which have been injected into formations in hydraulic fracturing operations. Similar apparatus which may be readily adapted to the purpose of this invention is disclosed in U.S. Pat. No. 4,585,939 which is assigned to the assignee of the present invention.

The system shown in FIG. 1 comprises a logging tool 10 which is suspended in and moved through a well borehole 11 on a logging cable 12 supported by a surface located reel 14 on a logging truck or the like. The borehole 11 which traverses earth formations 13 is lined with a tubular steel casing 15 which is cemented in place by an annulus of cement. The casing contains a borehole fluid 16. In conventional manner, rotation of the reel 14, which may be supported on a skid unit or truck (not shown), moves the cable. Measurement of the cable length in the borehole provides an indication of borehole depth as the cable 12 is moved into or out of the borehole. The tool 10 is provided with a toolcase housing 17 having over the gamma ray detector an optional cylindrical section 17a constructed from a material having a low atomic number (Z) and a low density to facilitate observation and measurement of photoelectric absorption of low energy gamma rays. Such a toolcase is disclosed in U.S. Pat. No. 4,504,736 assigned to the assignee of the present invention. For high temperature, high pressure applications, the housing could be made of titanium. In other instances, a smaller diameter steel tool housing can be used if photoelectric measurements are of relatively less importance.

Incident gamma rays whether from natural radiation or from tracers are detected in a large NaI (T1) crystal 18, the scintillations in which are coupled to a low noise photomultiplier 20 for producing electrical pulses having amplitudes proportional to the energies of the impinging gamma rays. The system gain is maintained to within ±0.5% by a coincidence stabilization technique for which purpose the apparatus includes in close proximity to the large detector 18, a much smaller crystal 22 containing an embedded $^{241}$Am source. When $^{241}$Am decays, a $^{60}$Kev gamma ray and a high energy alpha particle are emitted essentially simultaneously. The alpha particles are detected with virtually 100% efficiency in the smaller detector, whereas most of the $^{60}$Kev gamma rays escape. Approximately 20% of these gamma rays are detected in the large NaI detector. Since these gamma rays from the stabilizer are in coincidence with the alpha particles, they can be isolated from all other gamma rays detected in the large crystal 18 with better than 99% efficiency whereby the gamma ray coincidence spectrum will contain only $^{60}$Kev stabilizer gamma rays. It is therefore unaffected by changes in the number or distribution of external gamma rays. In addition, the anti-coincidence spectrum in the NaI crystal 18 contains gamma radiation originating exclusively from the formation and borehole region surrounding the tool, removing the need for stripping out stabilizer counts. Of course, other gain stabilization techniques, as are commonly used in the art, could alternatively be used if desired.

After amplification by a photomultiplier 20, both the coincidence and anti-coincidence data pulses are digitized in the tool by an analog-to-digital converter 24, accumulated in a data accumulator 26, and sorted by a microprocessor controller 28 which synchronizes transmission of data at regular data intervals from the tool 10 to equipment at the surface to be later described. The coincidence (stabilizer) events are converted into a 256 channel spectrum which spans the energy range from 0-350 Kev so as to enable the automatic downhole gain stabilizer feedback circuit to maintain system gain to approximately ±0.5%. The anti-coincidence (formation and borehole gamma radiation) events are converted into two 256 channel spectra, one spectrum of which spans the low energy range from 0-350 Kev and the other of which spans the high energy range from 0-3000 Kev. The three spectra are accumulated in the data accumulator 26 in the tool and are then transmitted by digital telemetry along the cable conductors, approximately each 0.25 ft. while logging, to the logging system located at the surface. At the earth surface, the data are demodulated by a demodulator 30 prior to recording on a magnetic tape recorder 32 and their simultaneous display in a spectral display device 34. The two formation spectra, high energy and low energy, are also transferred to the computer 36 in which the high energy spectrum is broken down into between 9 and 13 contiguous energy windows selected to encompass specific peaks from potassium, uranium, and thorium between 150 Kev and 3 Mev, and also to encompass the specific energy peaks of the radioactive tracers to be used in the fracturing operation. The term "window", as used herein, refers to a preselected range of gamma ray energies.

In the low energy spectrum, at least two windows are selected—one to measure gamma rays in an energy range sensitive to photoelectric absorption in iron, and another sensitive principally to Compton scattered radiation but not to photoelectric effects.

As previously stated, by monitoring the shape of the tracer spectrum, an indication can be obtained of the mean tracer penetration depth into the formation, which indication may be called the Tracer Penetration Index (TPI). The method for obtaining this indication is based on the phenomenon that the farther away a gamma ray source is located from the borehole detector, the more its spectrum will be degraded. An appreciation of such spectral degradation will be obtained by reference to FIG. 2 which depicts spectra obtained for the isotope $^{192}$Ir in the distinct situations wherein the isotope is present in the borehole fluid and wherein the isotope is present in the formation outside a casing and cement annulus. These spectra were collected in an experiment by a tool with a low-Z housing. For these curves, the spectral data have been normalized so that the amplitudes of the $^{603}$Kev (channel 55) peaks are the same. It can be observed that the $^{192}$Ir from the formation, as shown by the solid curve, clearly has a different character due to a larger fraction of lower energy scattered gamma rays than the $^{192}$Ir in the borehole. In particular, it is to be noted that the 311 Kev (channel 28) peak in the formation spectrum is almost obscured by the downscattered radiation.

A method which uses gamma ray spectroscopy to distinguish between tracer tagged material inside the well bore, in channels or voids in the cement, or actually in place in a fracture is described in a paper by Anderson, J. A., Pearson, C. M., Abou-Sayed, A. S. and Myers, G. D., "Determination of Fracture Height by Spectral Gamma Log Analysis," SPE Paper #15439, Sixty-First Annual Technical Conference, New Orleans, La., Oct. 5–8, 1986.

Accordingly, to practice the methods of the invention disclosed herein, a higher energy window A is selected to include the peaks of primary radiation which reach the detector with minimal Compton scattering collisions. A lower energy window B is selected for detecting gamma radiation which has been significantly Compton degraded through collisions prior to detection. If $C_A(R)$ is defined as the count rate recorded in window A for an arbitrary R, where R is defined as the mean radial distance of tracer from the detector, and $C_B(R)$ is the count rate recorded in energy window B for an arbitrary R, then it can be seen that:

$$C_A(R_2)/C_B(R_2) < C_A(R_1)/C_B(R_1) \text{ for } R_2 > R_1 \quad (1)$$

The ratio inequalities $C_A/C_B$ which result are due to the fact that a larger fraction of the primary gamma radiation is degraded by collisions with the intervening material as the distance R between the tracer location and the detector is increased. Thus by calibrating a system in terms of the amount of spectral degradation as a function of the radial distance R, a system is provided for determining from a tracer penetration index or TPI, the unknown mean radial distance R between tracer and detector from the relation R=f(TPI) where TPI=-$C_A/C_B$. A graphical plot showing a representative functional relationship between the tracer penetration index (TPI) and the mean radial distance R between a detector and tracer in a formation is shown in FIG. 4. Caution should be exercised, however, in choosing the lower energy limit of the TPI ratio software or hardware such that very low energy photoelectric absorption effects caused by the well casing will be eliminated. Approximately 150 Kev is adequate for this purpose.

Table I below from which selections of windows may be made contains high and low energy windows for Scandium-46, Ir-192 and Au-198.

TABLE I

| Tracer Isotope | High Energy Window (Kev) | Low Energy Window (Kev) |
|---|---|---|
| $^{46}$Sc | 825–1250 | 175–700 |
| $^{192}$Ir | 275–700 | 175–275 |
| $^{198}$Au | 325–500 | 175–325 |

NOTE:

$R = \dfrac{\text{High Energy Window}}{\text{Low Energy Window}} = \dfrac{C_A}{C_B}$ For processing the gamma ray count rates in the several energy ranges and obtaining elemental concentration in multitracer logs, the count rates can be additionally processed by the technique which employs a weighted-least-squares algorithm, such as described in U.S. Pat. No. 3,739,171 and U.S. Pat. No. 4,585,939. In such a technique, the basic response in the energy windows can be represented by a sensitivity element matrix, the data normalized and a weighted-least-squares algorithm applied for determining tracer concentrations.

It is to be understood, of course, that the technique described above for determining TPI can be significantly enhanced in many situations if the natural gamma ray background is removed prior to determining the shape of the tracer spectrum. Accordingly, the natural gamma ray radioactivity spectra, as evidenced by the potassium, uranium, and thorium window count rates, and those of their decay products or daughter products, can be obtained prior to tracer injection, and then substrated from the observed tracer plus background gamma ray count information prior to determining the shape of the particular tracer gamma ray spectrum.

It should be apparent, of course, that one potential component term in the above calculation of tracer penetration would be caused by residual tracer material in the borehole as well as being distributed radially outside the borehole into the formation. This borehole residual tracer would exhibit a very minimally downscattered spectrum and would weight the tracer penetration index (TPI) to indicate the presence of tracer in the borehole near the tool. It can be shown that in cased wells this borehole tracer can be separately identified and, by proper selection of an interval of the well bore which contains only borehole tracers and no other, the effects of borehole tracer on determination of the tracer penetration into the formation can be eliminated.

In cased hole situations photoelectric adsorption is the most important mode of gamma ray attenuation for energies less than about 100 Kev. This process is dominated by the element with the highest atomic number Z located between the source of tracer gamma rays and the detector in the logging tool. For tracer operations with the Low-Z tool case, the iron in the well casing has by far the highest atomic number Z of any significant downhole constituent. Thus the low energy portion of a tracer spectrum will be strongly influenced by whether or not the tracer gamma rays had to pass through the casing before reaching the detector.

Figure 3B:
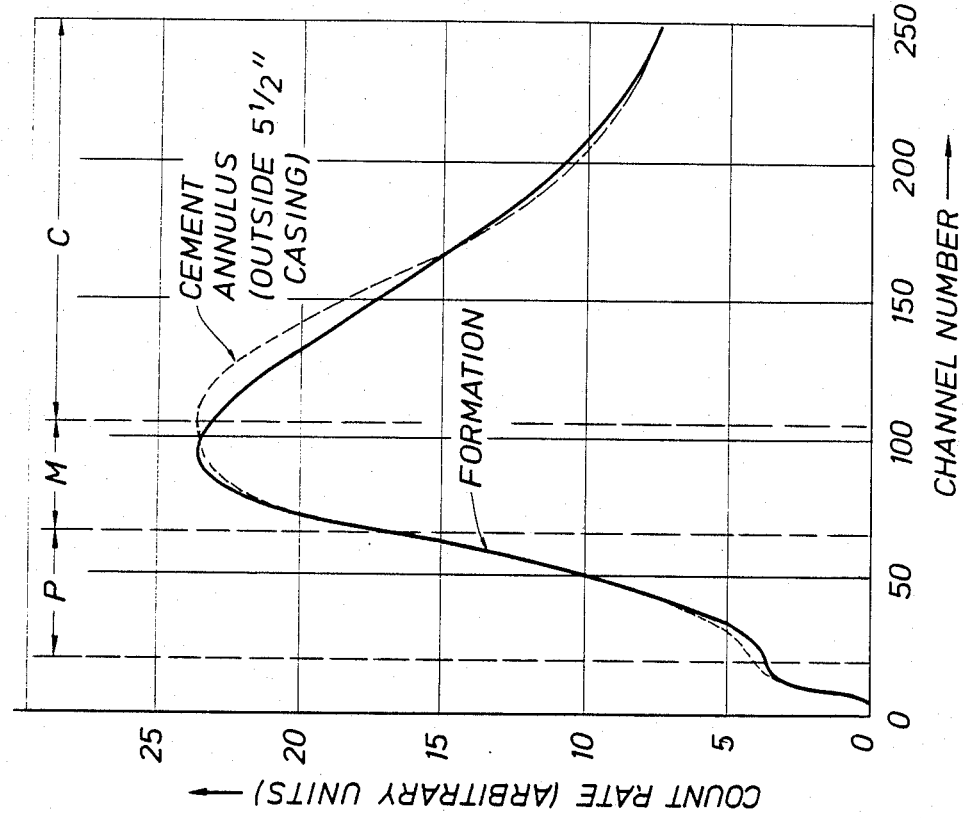
FIGS. 3a and 3b are graphical representations of formation, cement, and borehole spectra for $^{198}$Au, illustrating the effects of photoelectric absorption.
Figure 3A:
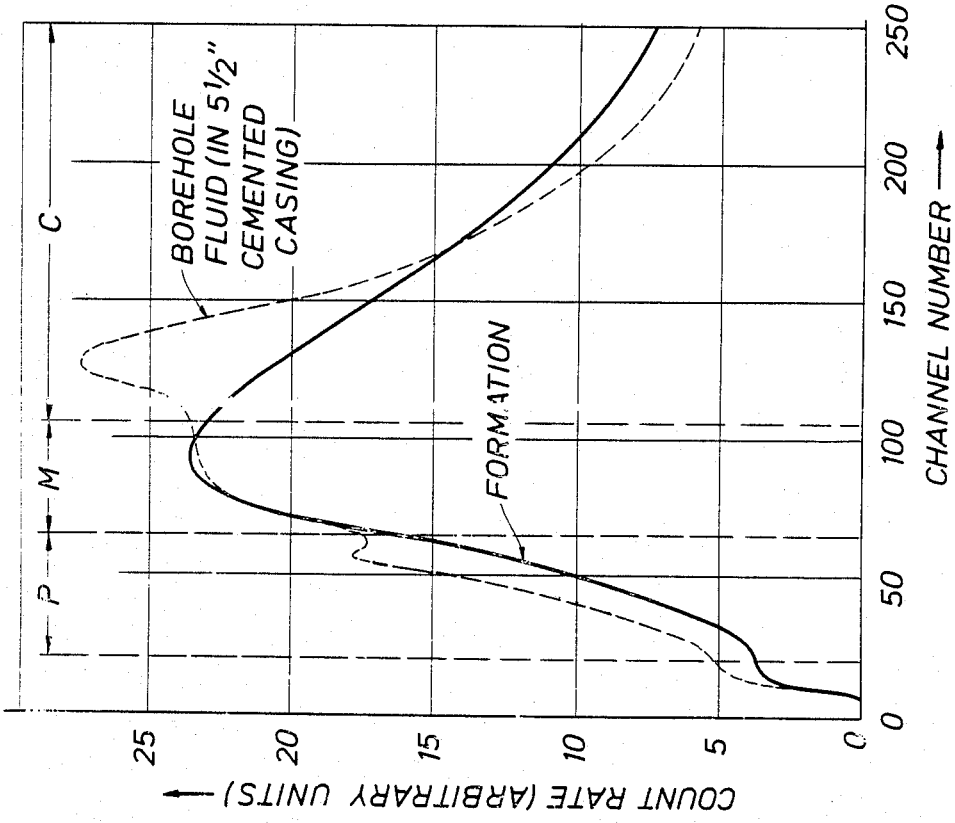

The low energy spectra (0–350 Kev) shown in FIG. 3 illustrate the principles underlying the photoelectric measurement. The spectra overlaid in FIG. 3(a) show the difference in photoelectric absorption from $^{198}$Au gamma rays originating in the formation outside a cemented 5½" casing relative to those coming from inside the casing. The spectra can be visually divided into three energy ranges. The lowest range, P, is sensitive to photoelectric absorption differences caused by the casing. The mid-energy range, M, is a region for which the photoelectric absorption and the Compton downscattering effects are of nearly the same importance. The upper range, C, is that for which Compton downscattering is significant and photoelectric absorption is negligible. A ratio, Rp, of gamma ray count rates in window M to those in window P is clearly photoelectrically sensitive and yet not markedly affected by Compton scattering effects. By similar illustration and comparison of $^{198}$Au spectra from the formation versus the cement annulus surrounding the casing in FIG. 3(b), it will be noted that significant spectral differences occur only in window C, which is dominated by Compton downscattering. Spectral shapes in windows M and P are essentially identical, hence Rp is not highly sensitive to relative radial tracer distribution outside the casing.

Since a tracer in the borehole fluid would not have to penetrate the iron casing in the wellbore to reach the detector, the observed count rates would show only minimal photoelectric absorption effects relative to count rates caused by any tracer originating outside the casing. Accordingly, if two low energy ranges of the tracer spectrum are chosen—one range "M" which is more sensitive to Compton scattered radiation, and a region "P", a lower energy range which is sensitive primarily to photoelectric absorption in iron—the ratio of these count rates M/P will be a sensitive indicator of whether casing is present between the source and detector and accordingly whether the tracer is inside or outside the casing.

It is apparent from the foregoing that if tracer is in the borehole then the photoelectric ratio M/P will be smaller in magnitude than it it were anywhere outside the casing. If tracer is present only in the formation, M/P will be greater in magnitude. For the situation where tracer is present in both the borehole and the formation, M/P will be intermediate these limits, dependent on the relative concentrations in each region. It is possible and preferred that M/O be output as a Tracer Borehole Index (TBI). Accordingly, a higher TBI will indicate tracer in the borehole. TBI, like TPI, may be slightly different for different tracers, so it would be necessary to separately calibrate and set limits for each.

In the event a tracer was located exclusively in the borehole, as indicated by either the tracer borehole index or by merely observing the presence of the tracer isotope considerably above and/or below any zone of injection, then it is possible to further refine the TPI index to compensate for borehole effects. The initial step is to measure the intensity and shape of the borehole spectrum where only borehole tracer is present. Then, assuming borehole fluid tracer is uniformly distributed in the borehole over the vertical interval logged, this spectrum could then be substrated from the spectra in zones having both borehole and formation tracers, as evidenced by zones having a lower TBI. The TPI can then be recalculated after the borehole count rate component has been removed from the spectra in the formations of interest to provide a more accurate TPI which is sensitive only to radial formation effects (i.e., sensitive only to tracer outside the casing).

It should be noted that the TBI measurement described above can only be detected if the toolcase on the logging instrument is designed to pass photoelectrically sensitive energies—such as in the case with the Low-Z tool case described earlier. Of course the TPI is not sensitive to photoelectric absorption, and hence could be measured with either a Low-Z or a conventional toolcase.

The TBI and TPI concepts will work best if only one tracer is used in the fracturing operation (TPI will be especially sensitive to multiple tracers). However, if more than one tracer is used the most likely implementation would be to time lapse log the zone of interest and use tracers with different half lives—this would provide a mechanism for separating the spectra from each of the isotopes, and then subsequently perform TBI and TPI calculations on the individually separated elemental spectra.

It will therefore be seen from the foregoing description of the invention, that methods are disclosed herein for obtaining an index for indicating mean tracer penetration into a fractured formation which information can be used to determine the extent of an induced formation fracture in the horizontal or radial direction with respect to a well bore. The invention also provides a method for obtaining a Tracer Borehole Index as an indication of whether tracer material is present in the borehole and for using the information to remove the effects of borehole tracer in determining the mean tracer penetration.

It is also to be understood, that the invention is not limited to the use of the particular tracer isotopes described herein, since other radioisotopes would serve as well.

What is claimed is:

1. A method for indicating the mean depth of penetration of one or more radioactive tracers injected from a well bore into fractures in a hydraulically fractured earth formation, said method comprising the steps of:
    (1) detecting the intensity of gamma radiation from said one or more radioactive tracers and earth formations by a gamma ray detector positioned in a logging tool in the well bore adjacent to the fractured interval of earth formation and obtaining data representative of said radiation intensity;
    (2) separating the gamma ray intensity data into an observed energy spectrum of detected gamma rays;
    (3) obtaining from said observed energy spectrum, count rates of gamma radiation in tow or more different energy ranges, at least one of which is sensitive primarily to unscattered and minimally Compton scattered gamma rays, and at least one other of which includes significant lower energy gamma rays having undergone Compton scattering prior to detection; and
    (4) combining said two or more count rates according to a predetermined relationship to produce a tracer penetration index which is indicative of the mean radial distance between the tracer and the detector in the logging tool.

2. The method of claim 1 wherein said separating steps include modification of the observed energy spectrum by removing therefrom background gamma radiation due to naturally occurring gamma rays in the formation from uranium, thorium, and potassium isotopes and their daughter products to obtain a modified spectrum representing solely the energy spectrum of the gamma radiation attributable to radioactive tracer elements.

3. The method of claim 2 wherein said naturally occurring gamma ray spectrum is obtained prior to the injection of radioactive tracer.

4. The method of claim 1 wherein said two or more different energy ranges are selected in regions of the energy spectrum where the effects of photoelectric absorption of the gamma radiation are negligible.

5. The method of claim 4 wherein said predetermined relationship is a ratio of the count rates of gamma radiation in said unscattered and minimally Compton scattered energy range to the count rates of gamma radiation in said lower energy range.

6. A method for determining in a cased well bore, the relative gamma ray activity from inside the casing as compared to gamma ray activity outside the casing in earth formation fracturing operations in which one or more radioactive tracers have been hydraulically injected from the borehole into earth formation fractures, comprising the steps of:
(1) detecting the intensity of gamma radiation from said one or more radioactive tracers distributed in the well borehole and from naturally radioactive elements in the surrounding earth formations by a gamma ray detector in a logging tool positioned in the borehole opposite and adjacent to the formation fracture and obtaining data representative of said radiation intensity;
(2) separating said radiation intensity data into an observed energy spectrum;
(3) obtaining from said observed energy spectrum, count rate signals of gamma ray intensity in at least two relatively low energy ranges, at least one of which is highly sensitive to photoelectric attenuation by iron in the well casing, and at least one of which is a higher energy range sensitive primarily to Compton scattered gamma rays from the radioactive tracers and much less sensitive to photoelectric absorption of gamma radiation by iron; and
(4) combining said at least two or more count rate signals according to a predetermined relationship to obtain a tracer borehole index which is indicative of the distribution of the detected gamma radiation originating inside the casing relative to the distribution of detected gamma radiation originating outside the well casing.

7. The method of claim 6 wherein said separating step includes modification of the observed energy spectrum by removing therefrom background gamma radiation due to naturally occurring gamma rays in the formation from uranium, thorium, and potassium isotopes and their daughter products to obtain a modified spectrum representing solely the energy spectrum of the gamma radiation attributable to radioactive tracers alone.

8. The method of claim 7 wherein said modified gamma ray energy spectrum corrected for naturally occurring gamma rays is obtained prior to the injection of radioactive tracers.

9. The method of claim 6 wherein said predetermined relationship includes a ratio of count rate signals in said Compton scattering sensitive energy range to those in said photoelectrically sensitive energy range.

10. A method for indicating the mean depth of penetration of one or more radioactive tracers injected from a cased well bore containing borehole fluid into fractures in a hydraulically fractured earth formation, said method comprising the steps of:
(1) detecting the intensity of gamma radiation from said one or more radioactive tracers and earth formations by a gamma ray detector positioned in a logging tool in the well bore at a first depth adjacent to the fractured interval of earth formation and obtaining data representative of said radiation intensity;
(2) separating the gamma ray intensity data into an observed energy spectrum of detected gamma rays;
(3) detecting the intensity of gamma radiation from said one or more radioactive tracers located inside the casing by a gamma ray detector positioned in the well bore at a different depth where the only detected gamma ray activity is from tracers in the borehole fluid and obtaining data representative of the gamma radiation intensity at said different depth;
(4) separating the gamma ray intensity data of radiation detected at said different depth into an observed energy spectrum of detected gamma rays from the borehole tracers;
(5) modifying the observed energy spectrum obtained in step (2) by removing therefrom the spectrum of tracers located inside the casing;
(6) obtaining from the modified observed energy spectrum, count rates of gamma radiation in two or more different energy ranges, at least one of which is sensitive primarily to unscattered and minimally Compton scattered gamma rays, and at least one other of which includes significant lower energy gamma rays having undergone Compton scattering prior to detection; and
(7) combining said two or more count rates according to a predetermined relationship to produce a tracer penetration index which is indicative of the mean radial distance between the tracers and the detector in the logging tool.

11. The method of claim 10 which further includes the additional modification of the observed spectrum obtained in step (2) by removing therefrom the background gamma radiation due to naturally occurring gamma rays in the formation from uranium, thorium, and potassium isotopes and their daughter products to obtain a modified gamma ray energy spectrum representing solely the energy spectrum of the gamma radiation attributable to radioactive tracer elements.

12. The method of claim 11 wherein said modified gamma ray energy spectrum corrected for naturally occurring gamma rays is obtained prior to the injection of the radioactive tracers.

13. A method for indicating the mean depth of penetration of one or more radioactive tracers injected from a cased well bore containing borehole fluid into fractures in a hydraulically fractured earth formation, said method comprising the steps of:
(1) detecting the intensity of gamma radiation from said one or more radioactive tracers and earth formations by a gamma ray detector positioned in a logging tool in the well bore at a first depth adjacent to the fractured interval of earth formation and obtaining data representative of said radiation intensity;
(2) separating the gamma ray intensity data into an observed energy spectrum of detected gamma rays;
(3) obtaining from the observed energy spectrum count rate signals of gamma ray intensity in two or more different energy ranges, at least one of which is a low energy range sensitive primarily only to Compton scattered radiation and at least one other of which is lower energy range which is sensitive to photoelectric absorption of gamma radiation by iron;

(4) combining said count rate signals obtained in the energy range which is sensitive primarily to Compton scattered radiation and the lower energy range which is sensitive to photoelectric absorption of gamma radiation by iron according to a predetermined relationship to obtain a tracer borehole index which is indicative of the distribution of the detected gamma radiation originating inside the casing relative to the distribution of detected gamma radiation originating outside the well casing;

(5) utilizing the tracer borehole index to select an interval of the well bore which contains substantially only gamma radiation from borehole tracers when a significant presence of said one or more radioactive tracers in the borehole fluid is indicated;

(6) detecting the intensity of gamma radiation from said one or more radioactive tracers located inside the borehole casing by a gamma ray detector positioned in the well bore in the selected interval at a different depth where the only detected gamma ray activity is from tracers in the borehole fluid and obtaining data representative of the gamma radiation intensity at said different depth;

(7) separating the gamma ray intensity data of radiation detected at said different depth into an observed energy spectrum of detected gamma rays from the borehole tracers;

(8) modifying the observed energy spectrum obtained in step (2) by removing therefrom the spectrum of tracers located in the borehole casing.

(9) obtaining from said modified observed energy spectrum, count rates of gamma radiation in two or more different energy ranges, at least one of which is sensitive primarily to unscattered and minimally Compton scattered gamma rays, and at least one other of which includes significant lower energy gamma rays having undergone Compton scattering prior to detection; and

(10) combining said two or more count rates according to a predetermined relationship to produce a tracer penetration index which is indicative of the mean radial distance between the tracers and the detector in the logging tool.

* * * * *